(12) United States Patent
De Barros et al.

(10) Patent No.: US 7,095,924 B2
(45) Date of Patent: Aug. 22, 2006

(54) OPTICAL FILTER

(75) Inventors: Carlos De Barros, Boulogne-Billancourt (FR); Marianne Molina, Paris (FR); Isabelle Riant, Orsay (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/869,882

(22) Filed: Jun. 18, 2004

(65) Prior Publication Data

US 2004/0258357 A1    Dec. 23, 2004

(30) Foreign Application Priority Data

Jun. 20, 2003    (FR) .................................. 03 07445

(51) Int. Cl.
*G02B 6/34*    (2006.01)
(52) U.S. Cl. .............................. 385/37; 385/28; 385/39
(58) Field of Classification Search .................. 385/37, 385/28, 39
See application file for complete search history.

(56) References Cited

U.S. PATENT DOCUMENTS 5,717,798 A    2/1998    Strasser et al.

6,578,388 B1 *    6/2003    Kewitsch et al. ............. 65/406

FOREIGN PATENT DOCUMENTS

DE    197 27 125 A1    1/1999

* cited by examiner

*Primary Examiner*—Frank G. Font
*Assistant Examiner*—Michael P. Mooney
(74) *Attorney, Agent, or Firm*—Sughrue Mion, PLLC

(57) ABSTRACT

An optical filter comprises a first mode converter converting an incident light signal propagating in an incident mode into a signal propagating in a propagation mode LPnm of order higher than that of said incident mode; a second mode converter converting the light signal of higher propagation order LPnm into a signal propagating in the incident propagation mode; and a slanted Bragg grating disposed between said first and second mode converters and adapted to couple the higher propagation order light signal LPnm in back-propagation into said incident mode. The filter is applicable to flattening gain and to multiplexing DWDM signals.

15 Claims, 4 Drawing Sheets

FIG_1 (Prior Art)
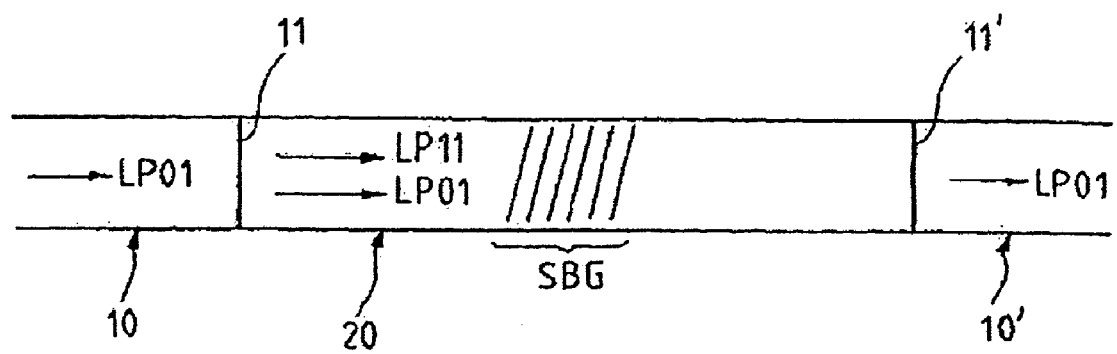
FIG_2
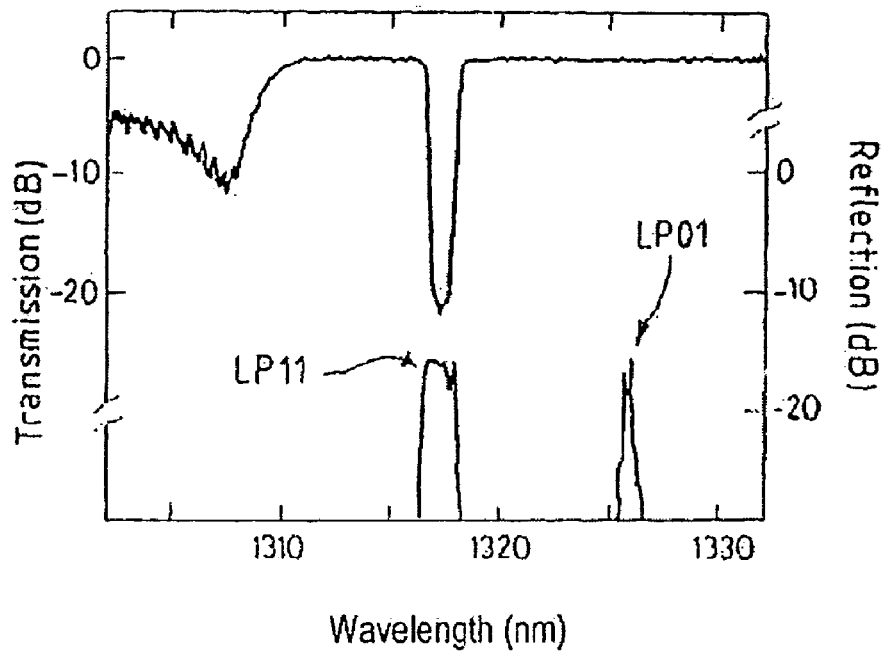

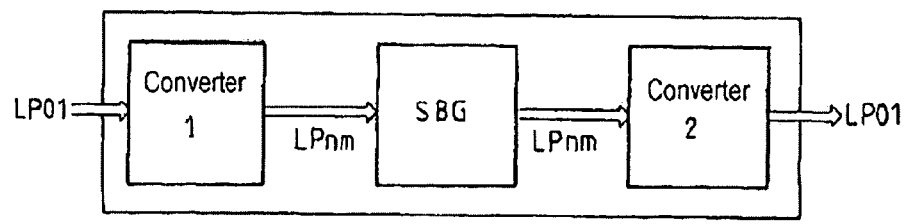
FIG_3
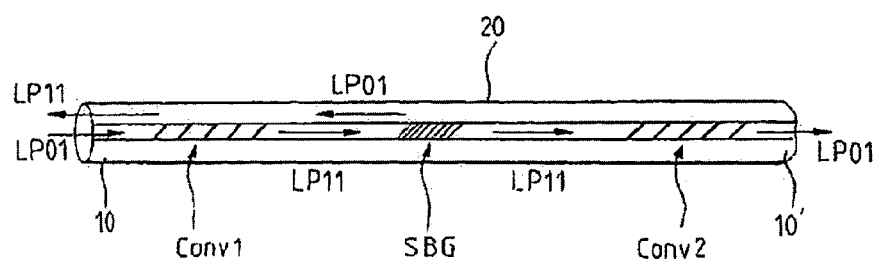
FIG_4
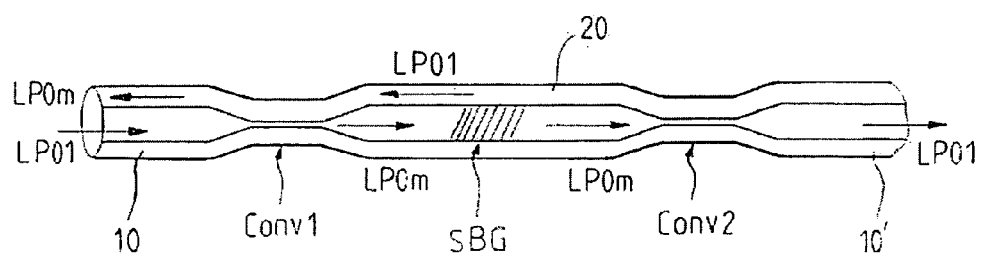
FIG_5

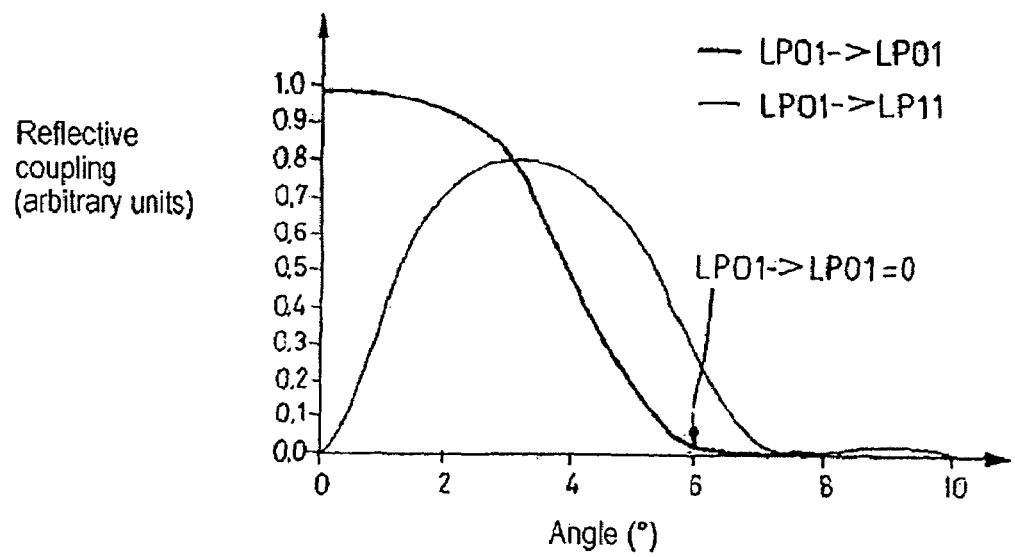
FIG_6a
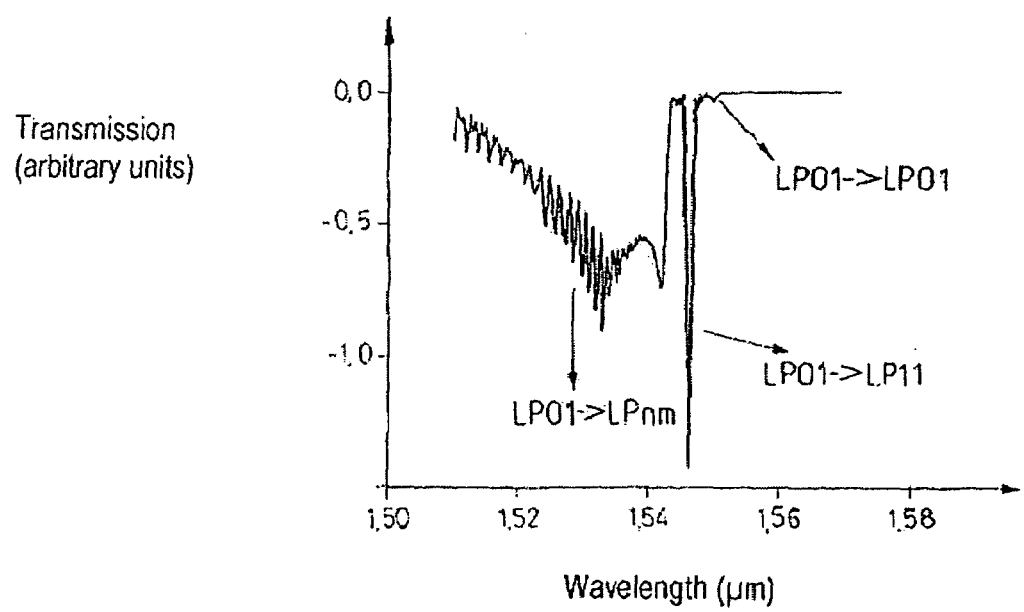
FIG_6b (Prior Art)

FIG_7a
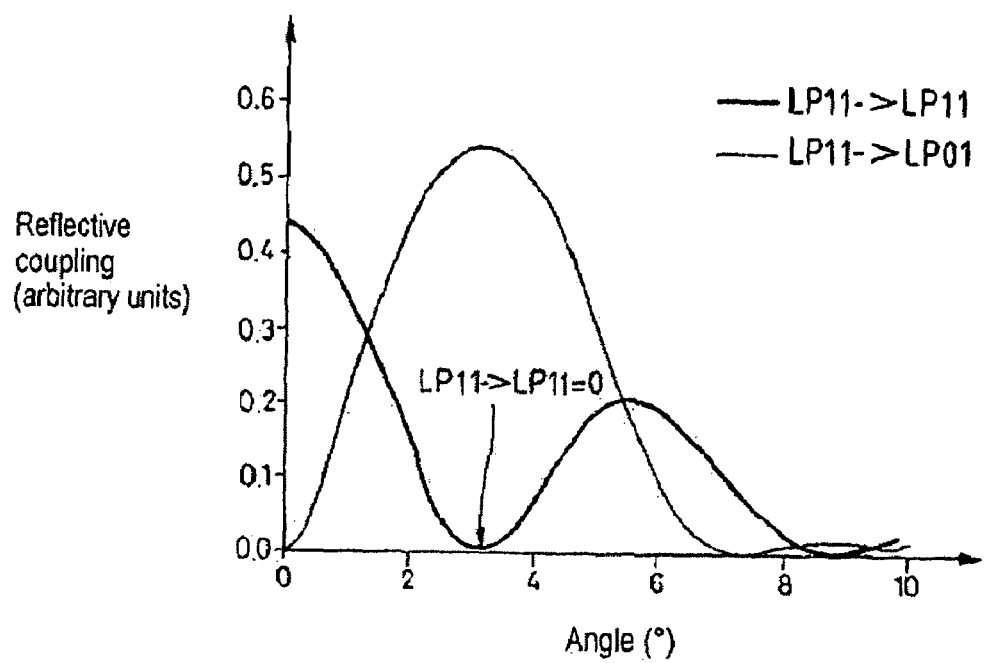
FIG_7b
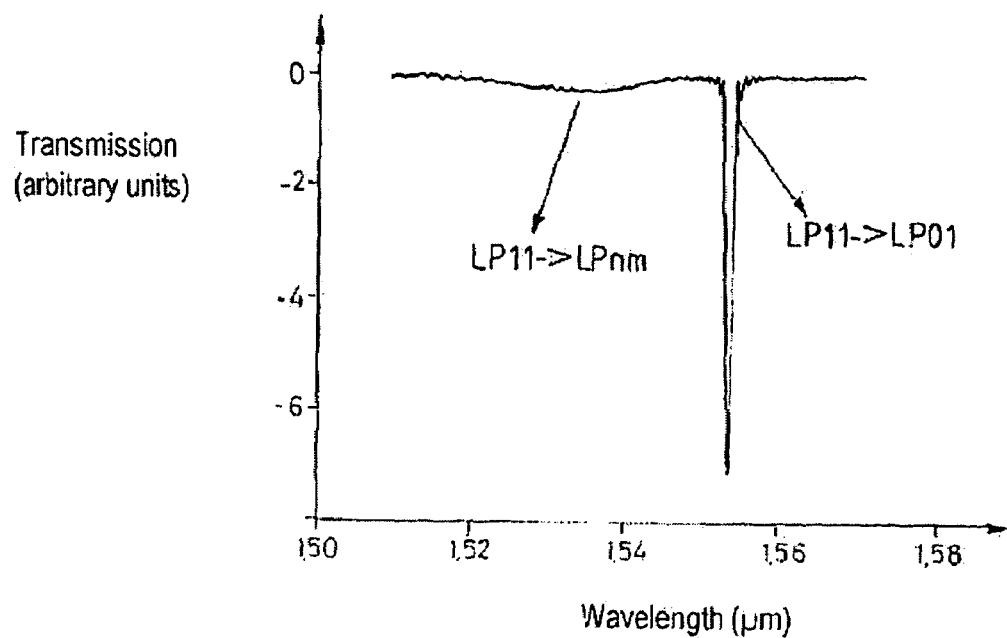

OPTICAL FILTER

The present invention relates to the field of optical filters constituted by Bragg gratings photoinduced in waveguides. The invention relates more particularly to gain equalizers, known as gain flattening filters (GFF).

A gain flattening filter may be constituted by a concatenation of Bragg gratings photoinduced in portions of a waveguide such as an optical fiber or a planar waveguide. A waveguide conventionally comprises an optical core having the function of transmitting and optionally amplifying a light signal, and cladding having the function of confining the light signal in the core. To this end, the refractive indices of the core $n_1$ and of the cladding $n_2$ are such that $n_1 > n_2$. As is well known, the propagation of a light signal in a single-mode waveguide comprises a fundamental mode guided in the core together with secondary modes guided over a certain distance in the core-cladding assembly, which modes are referred as cladding modes.

The core and/or the cladding of the waveguide may be doped in such a manner as to be made photosensitive in order to induce the Bragg grating, for example they can be doped with germanium (Ge).

The gratings conventionally used for gain flattening applications are angle gratings or slanted gratings known by the acronym SBG for slanted Bragg grating. Such gratings can be made to be practically non-reflecting and they are designed to provide coupling between the fundamental mode and the cladding modes. This makes it possible to omit optical isolators that are essential when gain flattening is performed using reflecting gratings such as straight Bragg gratings.

Gain flattening filters can be associated with optical amplifiers that are regularly distributed along a transmission line. Optical amplifiers as a general rule do not provide the same amplification at all of the wavelengths of the signals transmitted over the various channels in a given transmission line.

In particular, with the development of transmission applications using dense wavelength division multiplexing (DWDM), the differences in amplification over a given passband tend to become emphasized and the tolerances of gain flatteners tend to become ever tighter, i.e. the spectral response of the flattening filter must compensate the gain curve of the amplifier ever more closely. Thus, DWDM applications require individual filters to be made that are narrower and narrower and that present contrasts that are greater and greater. In applications of this kind, it is common for specifications to require contrasts of 5 decibels (dB) over a spectral band of less than 2 nanometers (nm). Using individual filters having such high-contrast, it is possible to concatenate filters so as to form a complex profile that corresponds to a particular amplification curve.

One possible solution for reducing the spectral width of an individual filter, while increasing its rejection ratio, is to improve mode coupling between the fundamental mode and the cladding modes, and in so doing to increase significantly the overlap integral between these modes. The overlap integral is defined as the area extending between the fundamental mode and the cladding modes, as weighted by the photosensitivity profile of the waveguide.

Several techniques have been proposed in the prior art for increasing this overlap ratio. A first solution consists in increasing the diameter of the core so as to enlarge the fundamental mode, thereby increasing overlap. That solution is nevertheless limited by the loss of the single-mode characteristic of signal propagation when core diameter becomes too great. In addition, that solution does not make it possible to achieve the characteristics required for DWDM applications.

Another solution consists in making the cladding photosensitive as well as the core so as to increase the weighting of the overlap area. Mention can be made for example of the publication by M. J. Holmes et al. entitled "Ultra narrow-band optical fiber sidetap filters", Technical Digest of ECOC'98. That publication describes an optical fiber having specific index and photosensitivity profiles that enable an SBG to be induced with a passband of 5 nm, which nevertheless remains too broad for DWDM applications.

An alternative solution is described in the publication by T. Strasser et al. entitled "Reflective mode conversion with UV-induced phase grating in two-mode fiber", Technical Digest of OFC Paper FB3 1997. That solution, shown in FIG. 1, consists in coupling the fundamental mode LP01 into another guided mode, in particular LP11. An SBG is induced in a weakly multimode optical fiber 20 known as a two-mode fiber, i.e. a fiber enabling two modes (specifically LP01 and LP11) to be guided. The two-mode fiber 20 is welded at 11 and 11' between two single-mode fibers 10, 10' conveying the single-mode light signal that is to be filtered. The incident LP01 mode is then coupled strongly into the LP11 guided mode, in addition to being coupled into the cladding modes. As a result, and as shown in FIG. 2, a high-contrast narrow-band filter is obtained at a given wavelength corresponding to LP01 to LP11 coupling.

That solution makes it possible to implement an optical filter whose passband is sufficiently narrow for DWDM applications (i.e. of nanometer order), but two other problems arise.

Firstly, parasitic coupling is observed in the cladding modes. The fundamental mode LP01 is strongly coupled into the guided mode LP11, but the "conventional" coupling of the fundamental mode into the cladding modes leaves a droop in the spectral response of the filter (visible in the transmission spectrum of FIG. 2). This droop prevents such a filter being used in a concatenation to build up a complex gain flattening filter.

Furthermore, the reflection or back-propagating coupling of the LP11 mode is too great compared with the required limit of 30 dB. This reflection stems essentially from the LP11 mode coupling back to the LP01 mode at the weld with the single-mode fiber, thereby introducing reflections into the fiber for conveying the incident signal.

Other publications make use of that filter principle and attempt to reduce reflection by special fiber profiles. Mention can be made for example of the publication by H. Renner et al. entitled "Suppression of back-reflection in tilted short-period mode-converting gratings", Technical Digest of BGPP'01.

The present invention provides an optical filter that enables high contrast to be achieved over a narrow passband without reflection.

To this end, the invention provides a non-reflecting optical filter comprising:

a first mode converter converting an incident light signal propagating in an incident mode into a signal propagating in a propagation mode LPnm of order higher than that of said incident mode;

a second mode converter converting the light signal of higher propagation order LPnm into a signal propagating in the incident propagation mode; and a slanted Bragg grating disposed between said first and second mode converters and adapted to couple the higher propagation order light signal LPnm in back-propagation into said incident mode.

According to a characteristic, the incident light signal propagates in the fundamental mode LP01.

In embodiments, higher-order mode is LP11 mode or LP0m mode.

In an embodiment, the grating, and the first and second mode converters are integrated in a single continuous waveguide.

In an embodiment, at least one of the mode converters is an optical waveguide taper.

In an embodiment, at least one of the mode converters is a long-period grating.

In an embodiment, at least one of the mode converters is a converter in free space.

In an embodiment, the slanted Bragg grating is of varying period (chirp).

In an embodiment, the slanted Bragg grating is apodized.

In an embodiment, the filter comprises a plurality of concatenated slanted Bragg gratings.

In an embodiment, the slanted Bragg grating is sampled.

The invention also provides a gain equalizer including an optical filter of the invention.

The invention also provides a multiplexer including an optical filter of the invention.

The features and advantages of the invention will appear more clearly on reading the following description given by way of illustrative and non-limiting example, and made with reference to the accompanying figures, in which:

FIG. 1, described above, shows a prior art optical filter;

FIG. 2, described above, shows a transmission spectrum for the FIG. 1 filter;

FIG. 3 is a block diagram of a filter of the invention;

FIG. 4 is a diagram of a first embodiment of the filter of the invention;

FIG. 5 is a diagram of a second embodiment of the filter of the invention;

FIG. 6a is a graph showing the reflection coupling of the fundamental mode as a function of the angle of the SBG;

FIG. 6b is a transmission spectrum for a filter of the prior art;

FIG. 7a is a graph showing the reflection coupling of LP11 mode as a function of the angle of the SBG; and FIG. 7b is a transmission spectrum of a filter of the invention.

FIG. 3 is a block diagram of a filter of the invention. A slanted Bragg grating SBG couples energy from a signal propagating in a higher-order mode LPnm to the fundamental mode LP01. For this purpose, the SBG is induced in a multimode fiber disposed between two mode converters.

An incident signal is injected into an optical filter having an inlet and an outlet. A first converter coverts the incident signal into a signal propagating in a higher-order mode LPnm. The energy of this higher-order signal LPnm is then strongly coupled in back-propagation by the SBG on the guided fundamental mode LP01. As a result, a signal is obtained at the outlet from the grating on a higher-order mode filtered over a narrow passband with high contrast. A second mode converter converts the spectrally-filtered signal propagating towards the outlet of the optical filter in LPnm mode into a filtered signal propagating in the initial incident mode LP01.

Thus, unlike prior art filters which couple the fundamental mode LP01 and another guided mode LP11 in co-propagation, the invention proposes coupling a higher-order mode, such as LP11 mode, for example, in back-propagation with the fundamental mode LP01. This coupling from a higher-order mode makes it possible to achieve the contrast required for DWDM applications, and also makes it possible to overcome problems of spectral response droop due to coupling in the cladding modes and problems of back-reflection.

By appropriately dimensioning the SBG, the coupling in back-propagation of higher-order modes LPnm into cladding modes can be negligible relative to the coupling into the fundamental mode LP01.

Furthermore, the mode converters eliminate any possible reflection. The angle at which the SBG is induced should be selected as a function of obtaining zero reflection for the higher-order mode, and total reflection of the LP01 mode will be converted back into LPnm mode. However, this higher-order mode LPnm does not propagate in the fiber that delivers the incident signal, and therefore does not create any reflection in the transmission line.

FIG. 4 shows an embodiment of the filter of the invention. A single-mode optical fiber 10 transmits an incident optical signal in a fundamental propagation mode LP01. A first converter Conv1 converts all of the light energy from mode LP01 into a higher-order mode LPnm.

For example, a 100% converter for transferring the energy of LP01 mode into LP11 mode can be obtained by a long-period grating (LPG). In this respect, mention can be made of the publications by Kyung S. Lee et al. entitled "Transmissive tilted grating for LP01–LP11 mode coupling", JOSA A, Vol. 18, No. 5, May 2001, and the publication of Kyung S. Lee et al. entitled "Mode coupling in spiral fiber grating", Elec. Letters, Vol. 37, No. 3, February 2001. An LPG may also be used for converting the energy of LP01 mode into LP02 mode, with reference being made to the publication by S. Ramachandran et al. entitled "Large bandwidth, highly dispersive efficient coupling using LPG in dispersion fibers", Tech Digest of OFC'01-MC2-1.

The description of FIG. 4 is given using conversion into LP11 mode by way of example.

A weakly multimode fiber 20 is disposed at the outlet from the first converter Conv1 guiding at least LP01 mode and LP11 mode. An SBG is induced in this portion of multimode fiber. The angle of the grating is selected so as to prevent any coupling in back-propagation of the LP11 mode onto itself, which mode is carrying the light energy. Thus, the SBG couples the major fraction of the energy of the LP11 mode in back-propagation into the fundamental mode LP0, and very little into the cladding modes, thus creating a filter that is very narrow and highly contrasted. The light signal at the outlet from the SBG propagates in the filtered LP11 mode. A portion of the light energy is transmitted in back-propagation in the LP01 mode. Nevertheless, this reflection is stopped by the converter Conv1 which converts the reflected energy carried by the LP01 mode into LP11 mode which is subsequently not guided by the single-mode fiber 10. As a result, no reflection into LP01 mode disturbs the transmission fiber 10.

The signal delivered to the outlet from the SBG in LP11 mode is subsequently converted by a second converter Conv2, such as another LPG, into a signal having the same spectral form, and propagating in LP01 mode in a single-mode transmission fiber 10'.

FIG. 5 shows another embodiment of the invention. Elements that are the same as those described in FIG. 4 are given the same references. In this embodiment, the converters Conv1 and Conv2 are constituted by optical waveguide tapers. Such converters are adapted to convert 100% of the energy from the fundamental mode LP01 into a higher-order mode LP0m that is even, for example into LP02 mode.

An embodiment that is not shown consists in making the mode converters in free space, e.g. by means of the converters described in patent application WO 99/49342.

In the embodiments described with reference to FIGS. 4 and 5, the entire filter can be disposed in a continuous waveguide. Such an embodiment reduces light losses and improves integration of the component in a transmission line, for example.

The single-mode or multimode nature of a fiber is defined by a variable V which determines the number of modes that can propagate in a fiber. This variable, which depends on wavelength, is proportional to the diameter of the fiber core and to the index difference between the core and the cladding of the fiber. At 1550 nm, a V of less than 2.407 qualifies a fiber as being single-mode, and V lying in the range 2.4 to 3.8 qualifies a fiber as being a two-mode fiber.

FIGS. 6a to 6b show the properties of a filter of the invention compared with those of a prior art filter.

A standard two-mode fiber with a 4 micrometer (μm) photosensitive core was used to receive an induced SBG and to observe the spectral response with an incident signal at the SBG in LP01 mode (FIGS. 6a and 6b) and with an incident signal at the SBG in LP11 mode (FIGS. 7a and 7b).

The graph of FIGS. 6a and 7a plot in arbitrary units the reflective coupling respectively of LP01 mode and of LP11 mode as a function of the angle at which the SBG is induced. In both cases, the angle at which the SBG was induced was selected so that coupling of the incident mode onto itself was zero. When the signal incident at the SBG propagates in LP01 mode, then the grating is induced at 6°; whereas when the incident signal is propagating in LP11 mode, the grating is induced at 3.2°.

FIG. 6b plots in arbitrary units the transmission spectrum of an SBG induced at 6°, when used with an incident light signal propagating in LP01 mode. This figure also shows the spectral signature of the coupling, and it can be seen that the back-propagating coupling of LP01 mode into LP11 mode is strong, but the coupling of LP01 mode into cladding modes is negligible. The spectral response of such a filter is thus narrow and highly contrasted, but only over a small band. Thus, if it is desired to induce a plurality of SBGs for making filters at wavelengths that are distinct but close to one another, the spectral response droop constituted by the coupling into cladding modes could pollute the response of another filter.

FIG. 7b plots in arbitrary units the transmission spectrum of an SBG induced at an angle of 3.2° with an incident light signal propagating in LP11 mode. It can be seen that the coupling in back-propagation of the LP11 mode into the LP01 mode is strong and that the coupling of the LP11 mode into the cladding modes is negligible compared with the coupling of LP11 into LP01. The filter of the invention thus succeeds in eliminating the spectral response droop of the coupling of cladding modes when a plurality of SBGs are induced at wavelengths that are distinct but close to one another.

The invention thus makes it possible to implement an individual filter which couples the energy of the incident mode into a single mode. It is thus possible to work on the shape of the filter spectrally, for example by making an apodized chirped SBG so as to constitute a complex filter. Period variation (chirp) enables coupling to take place at distinct wavelengths, and varying the modulation amplitude of photoinduction along the grating, i.e. apodization, makes it possible to give different weights to each of the wavelengths.

The filter of the invention may also comprise a plurality of concatenated SBGs or a sampled SBG over a portion of a multimode fiber.

Such filters find applications in flattening gain, in particular to constitute the complex profiles required when amplifying DWDM signals; or when multiplexing DWDM signals, in order to extract certain wavelengths from amongst other wavelengths that are close to one another.

What is claimed is:

1. A non-reflecting optical filter comprising:
   a first mode converter converting an incident light signal propagating in an incident mode into a signal propagating in a propagation mode LPnm of order higher than that of said incident mode;
   a second mode converter converting the light signal of higher propagation order LPnm into a signal propagating in the incident propagation mode; and
   a slanted Bragg grating disposed between said first and second mode converters and adapted to couple the higher propagation order light signal LPnm in back-propagation into said incident mode.

2. An optical filter according to claim 1, characterized in that the incident light signal propagates in the fundamental mode LP01.

3. An optical filter according to claim 1, characterized in that the higher-order mode is LP11 mode.

4. An optical filter according to claim 1, characterized in that the higher-order mode is LP0m mode.

5. A filter according to claim 1, characterized in that the grating, and the first and second mode converters are integrated in a single continuous waveguide.

6. An optical filter according to claim 5, characterized in that at least one of the mode converters is an optical waveguide taper.

7. An optical filter according to claim 1, characterized in that at least one of the mode converters is a long-period grating.

8. An optical filter according to claim 1, characterized in that at least one of the mode converters is a converter in free space.

9. An optical filter according to claim 1, characterized in that the slanted Bragg grating is of varying period (chirp).

10. An optical filter according to claim 1, characterized in that the slanted Bragg grating is apodized.

11. An optical filter according to claim 1, characterized in that it comprises a plurality of concatenated slanted Bragg gratings.

12. An optical filter according to claim 1, characterized in that the slanted Bragg grating is sampled.

13. A gain equalizer including an optical filter according to claim 1.

14. A multiplexer including an optical filter according to claim 1.

15. An optical filter according to claim 1, wherein only a single light signal is propagated to the slanted Bragg grating.

* * * * *